Dec. 14, 1954  C. E. DEARDORFF ET AL  2,696,827
VALVE FOR POWER AND MANUAL ACTUATION
Filed Feb. 13, 1951
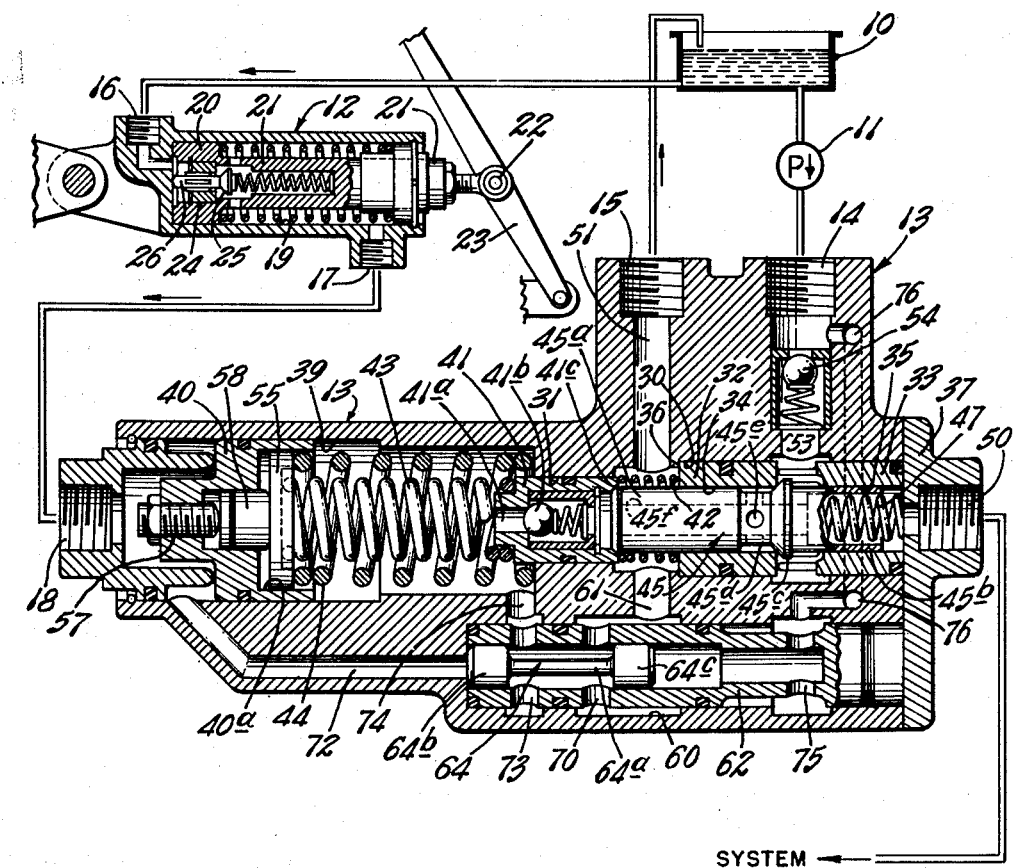
INVENTORS
C. E. Deardorff
F. W. Schneck
BY *Ell Woodbury*
ATTORNEY

United States Patent Office 2,696,827
Patented Dec. 14, 1954

2,696,827

VALVE FOR POWER AND MANUAL ACTUATION

Clinton E. Deardorff, San Fernando, and Frederick W. Schneck, Northridge, Calif., assignors to Bendix Aviation Corporation, South Bend, Ind., a corporation of Delaware Application February 13, 1951, Serial No. 210,772

9 Claims. (Cl. 137—102)

This invention relates to hydraulic valves for controlling the rate and pressure at which hydraulic fluid is delivered to a utilization system, such as the wheel cylinders of the brakes of a vehicle.

In small capacity hydraulic brake systems it is customary to employ a foot or hand-actuated master cylinder for directly delivering pressure fluid to the wheel cylinders. In large capacity systems it is customary to employ a foot or hand-actuated master valve for controlling delivery of pressure fluid from a pump, accumulator, or other source, to the wheel cylinders. The master valve may be actuated by hand or foot force directly through a mechanical linkage, or it may be hydraulically actuated by a master cylinder which is directly actuated by hand or foot force. The present invention relates specifically to the latter type, although it also involves features applicable to the directly actuated type of valve.

An object of the invention is to provide a master valve actuated by a master cylinder that is effective to normally control the delivery of fluid from a pressure source, but in the event of failure of the pressure source, delivers fluid from the master cylinder.

Another object is to provide an improved valve structure useful in either a mechanically or hydraulically actuated master valve.

A feature of the invention is a hydraulically-actuated master valve responsive to both the master cylinder pressure and the power source pressure for delivering fluid from that one of the two that has the highest pressure.

Other more specific objects and features of the invention will appear from the detailed description to follow, which refers to the drawing.

In the drawing, the single figure shows a hydraulic system including a valve in accordance with the invention.

The system shown in the drawing comprises a reservoir 10 supplying fluid at low pressure to a pump 11. The pump 11 delivers fluid at high pressure to a pressure port 14 of a valve 13 in accordance with the invention, and fluid can be exhausted from an exhaust port 15 of the latter valve back to the reservoir 10. The reservoir also supplies fluid to the intake port 16 of a master cylinder 12, and the output port 17 of the master cylinder is connected to a control pressure port 18 of the valve 13.

The master cylinder 12 is of conventional construction comprising a cylinder 19 connected at its left end to the port 16, and near its right end to the port 17. There is positioned within the cylinder 19 a piston 20 having a piston rod 21 which extends through the right end of the cylinder and is adapted to be connected as by an eye 22 to a brake pedal or a brake handle, a portion of which is illustrated at 23. The piston 20 has a central passage 24 therein, the inner end of which constitutes a valve seat cooperating with a poppet 25 on the right end of a stem 26 which extends through the passage 24 and is slightly longer than the passage. When the piston 20 is in its leftmost position, as shown in the drawing, the stem 26 abuts against the end of the cylinder and lifts the poppet 25 off its seat. To apply the brakes the handle 23 is rocked clockwise, thereby moving the piston rod 21 and the piston 20 to the right. As the piston 20 leaves its leftmost position, the poppet 25 closes against its seat thereby preventing any return flow of fluid from the cylinder through the inlet port 16, and the continuing movement of the piston 20 forces the fluid contained in the cylinder through the port 17 and into the control port 18 of the control valve 13. On its return movement, to the left, of the piston 20, the poppet 25 is opened off its seat by the pressure of fluid in the intake port 16, permitting the cylinder to fill. By repeatedly moving the piston to the right, fluid can be delivered through the port 17 on each stroke.

The valve 13 defines a chamber 30. The left end of this chamber is constituted by a first cylinder 31. There are fitted in the right end of the chamber 30 a pair of stationary sleeves 32 and 33 which define second and third cylinders 34 and 35 respectively. These sleeves 32 and 33 abut against each other, and the sleeve 32 abuts against a shoulder 36 in the body, and the right end of sleeve 33 is held in position by an end cap 37 on the body.

Leftward of the first cylinder 31, the body defines a control cylinder 39 containing a control piston 40 which slidably seals therewith. The control piston 40 moves in response to pressure in the control port 18, which communicates directly with the left end of the cylinder 39.

A reaction piston 41 is fitted in the first cylinder 31, this piston separating the control cylinder 39 from the chamber 30. The piston 41 has a passage 41a extending therethrough which is normally closed by a check valve 41b which permits flow from left to right, but prevents flow from right to left through the piston. The right end of the piston constitutes an annular valve face 41c. A light helical compression spring 42 compressed between the sleeve 32 and the right end of the piston 41 urges the latter to the left.

The piston 41 is mechanically connected to the control piston 40 by a helical compression spring 43 which is relatively heavy as compared to the spring 42. An auxiliary helical compression spring 44 of larger diameter than and enclosing the spring 43 is interposed between the control piston 40 and the right end of the cylinder 39 to provide additional resistance to rightward movement of the control piston 40 in response to pressure in the control port 18.

There is positioned in the chamber 30 a hollow, reciprocable, valve member 45 having a piston portion 45a sealing in the second cylinder 34, a piston portion 45b sealing in the third cylinder 35, and having intermediate the piston portions 45a and 45b a poppet 45c adapted to seat against the right end of the second cylinder 34. Between the piston portion 45a and the poppet portion 45c, the valve member 45 has an annular groove 45d which is communicated by a lateral passage 45e with the central passage 45f, which extends through the valve member. A helical compression spring 47, compressed between the right end of the cylinder 35 and the end of a counterbore in the valve member 45, urges the member to the left, to normally seat the poppet 45c against the end of the cylinder 34. The right end of the cylinder 35 is in constant communication with a delivery port 50, which is adapted to be connected to the wheel cylinders or other hydraulic motor devices to be actuated by the system.

The exhaust port 15 is communicated by a passage 51 with the portion of the chamber 30 between the first cylinder 31 and the second cylinder 34, and the pressure port 14 is communicated by a passage 53 with the chamber 30 between the second cylinder 34 and the third cylinder 35. A check valve 54 in the passage 53 permits flow of pressure fluid into the passage 53 while preventing return flow.

To permit adjustment of the maximum loading of the springs 43 and 44, the latter rest against an adjustable element 55 positioned in a counterbore 40a in the right end of the piston 40, and this element 55 can be adjusted by a screw 57 which abuts against a filler plug 58 interposed between the end of the screw 57 and the element 55.

There is provided in the body 13 a chamber 60 positioned alongside the chamber 30 and connected thereto by a port 61 between the first cylinder 31 and the second cylinder 34. The chamber 60 contains a sleeve 62 defining a cylinder containing a shuttle valve 64 consisting of a stem 64a connecting two heads 64b and 64c respectively. The port 61 is in communication with the port 70 intermediate the ends of the sleeve 62. The left end of the sleeve is communicated by a passage 72 with the control port 18. Ports 73 near the left end of the sleeve 62 are communicated by a passage 74 with the right end of the control cylinder 39, and ports 75 near the right end of the sleeve 62 are communicated by a passage 76 with the pressure port 14 on the pump side of the check valve 54 in that passage, so that pump pressure is applied at all times to the right end of the sleeve 62.

The device functions as follows: When the piston of the master cylinder 12 is in its rest position in the left end of the master cylinder, there is no pressure in the control port 18, and the control piston 40 is urged into its leftmost position by the springs 44 and 43. The shuttle piston 64 is in its leftmost position because full pump pressure is applied to the right end thereof through the passage 76, and there is no pressure in the left end of the sleeve 62. Hence the control cylinder 39 is communicated by the passage 74 and the ports 73 and 70 and the passage 61 with the portion of the chamber 30 intermediate the first and second cylinders 31 and 34 respectively, which portion of the chamber is permanently connected by the passage 51 to the return or exhaust port 15. In this leftmost position of the control piston 40, the force supplied by the spring 43 to the reaction piston 41 is insufficient to overcome the force of the spring 42 (because the spring 43 is nearly fully extended, whereas the spring 42 is not), and the valve face 41c on the reaction piston is slightly spaced from the cooperating face on the left end of the piston portion 45a of the reciprocable valve member 45. Hence, the delivery port 50 is connected through the passage 45f in the valve member 45 to the exhaust passage 51.

Now let it be assumed that, with the pump 11 maintaining a high fluid pressure in the pressure port 14, the lever 23 is rocked clockwise to move the piston in the master cylinder to the right and deliver fluid at increasing pressure into the control port 18 of the valve 13. Flow of this fluid through the passage 72 is blocked by the fact that the head 64b of the shuttle valve 64 is between the left end of the sleeve 62 and the port 73. It may further be assumed that the pressure applied from the pump 11 to the right end of the shuttle piston 64a is greater than any pressure developed by the master cylinder 12, so that the shuttle valve 64 will remain in its leftmost position throughout the operation.

Under the circumstances described, flow of control fluid through the port 18 must displace the control piston 40 to the right, thereby exerting, through the spring 43, a force on the reaction piston 41 urging the latter to the right. Slight compression of the spring 43 raises its reactive force above the reactive force of the lighter spring 42 so that the reaction piston 41 immediately moves to the right, causing its valve face 41c to seal against the left end of the piston portion 45a of the reciprocable valve member, thereby breaking communication between the exhaust passage 51 and the delivery port 50. At this time, the right end of the control cylinder 39 is connected by the passage 74, the ports 73 and 70 in the sleeve 62, and the passage 61 with the exhaust passage 51, so that no pressure can be developed in the right end of the control cylinder 39 as the control piston 40 is moved to the right. Therefore the only force applied to the reaction piston 41 is that transmitted through the spring coupling member 43.

As soon as the control piston 40 moves a short distance after contact of the reaction piston 41 with the valve member 45, the force applied to the reaction piston by the spring 43 exceeds the force of the spring 47, so that the reaction piston and the reciprocable valve member 45 are moved to the right, unseating the poppet 45c from the right end of the second cylinder 34 and permitting high pressure fluid from the pressure port 14 to flow past the check valve 54 and through the transverse passage 45e into the hollow interior 45f of the reciprocable valve member, and thence through the delivery port 50 to the brake system.

The pressure existent in the delivery port 50 is transmitted through the hollow valve member 45 to the right end of the reaction piston 41, so that as the brakes are filled and the pressure rises in the delivery port 50, an increasing resistance to rightward movement of the reaction piston 41 is developed. This increased force results in the development of a higher pressure in the control port 18 and in the master cylinder 12, to apprise the operator of the brake force that is being developed. When the pressure in the delivery port 50 rises to a sufficient value, it will move the reaction piston 41 to the left, thereby permitting the spring 47 to move the reciprocable valve member 45 back to the left, to seat the poppet 45c and cut off connection between the pressure port 14 and the delivery port 50. A further increase in pressure moves the reaction piston 41 farther to the left, compressing the spring 43 in so doing, and permitting pressure fluid to escape through the port 50 to the exhaust passage 51.

When the operator desires to release the brakes, he restores the control lever 23 to its leftmost position, which removes all pressure from the control port 18, permitting the control piston 40 to be restored to its normal leftmost position by the springs 43 and 44. This also permits the reaction piston 41 to be restored to its leftmost position by the spring 42, which connects the delivery port 50 to the exhaust passage 51.

Now let it be assumed that the pump 11 has failed, and that there is no pressure existent in the pressure port 14. Subsequent manipulation of the lever 23 to apply the brakes develops pressure in the control port 18 and in the passage 72 and against the left end of the shuttle valve 64, which is unopposed by pressure on the right end thereof. Hence, the shuttle valve moves into its rightmost position, in which the passage 72 is communicated through the port 73 and the passage 74 with the right end of the control cylinder 39, and the path from the passage 72 through the port 70 to exhaust is blocked. The result is that the pressure fluid supplied by the master cylinder flows through the passage 72, the port 73, the passage 74 and the control cylinder 39, and through the passage 41a, past the check valve 41b in the reaction piston, thence through the passage 45f in the reciprocable valve member, to the delivery port 50, to actuate the brake system directly. By reciprocating or "pumping" the actuating lever 23, the operator can supply sufficient fluid to fill the brake system and apply the brakes even though the pump 11 has failed.

It may be that in some instances the pump 11 does not fail completely but supplies fluid at a pressure lower than that capable of being developed by the master cylinder 12.

Under this condition, the shuttle valve 64 will initially be in leftmost position, and the apparatus will function as first described, to deliver fluid from the pump 11 to the delivery port 50 until the pressure delivered by the master cylinder exceeds that delivered by the pump 11. When this occurs, the shuttle valve 64 will be moved to the right, and thereafter fluid will be delivered directly from the master cylinder, past the check valve 41b to the delivery port 50 in accordance with the second mode of operation. It will be observed therefore that the system utilizes any pressure fluid that may be delivered by the pump 11, thereby relieving the operator of the necessity of supplying pressure fluid to the brakes directly from the master cylinder until the braking pressure required exceeds that being delivered by the pump 11.

It will be noted that under the conditions last described, the shuttle piston 64 moves to the right after the control piston 40 has moved to the right and compressed the springs 43 and 44. The movement of the shuttle valve disconnects the right end of the control cylinder 39 from the exhaust port 15 and connects it to the control port 18, thereby equalizing the pressures on opposite sides of the control piston 40. The springs 43 and 44 then restore the control piston to normal position. This reduces the reaction pressure in port 18 and the master cylinder 12, thereby apprising the operator that the power pressure is insufficient and that he must "pump" the lever 23 to increase the braking effect. Thus when the power pressure in port 14 is adequate, the reaction pressure at the master cylinder is proportional to the delivery port pressure acting on the reaction piston 41, plus the force of the auxiliary spring 44, and is inversely proportional to the area of the control piston 40. On the other hand, when the power pressure is inadequate, the reaction pressure at the master cylinder is only that in the delivery port 50 plus the small pressure drop across the check valve 41b. By suitably choosing the area of the control piston 40 and the strength of the auxiliary spring 44, one can obtain any desired reduction in reaction pressure at the master cylinder when the shuttle valve 64 shifts from power position to manual position.

The master cylinder 12 should be designed to meet the volume and pressure requirements of the brake system connected to the delivery port 50, and, to this end, the displacement of the master piston 20 is preferably larger than it would need to be for the mere control of the valve 13. Because of the large displacement of the master piston 20, the control piston 40 is made larger than the reaction piston 41 to permit an appreciable range of movement of the master piston 20 relative to the resultant movement of the control piston 40, and thereby prevent oversensitivity of response of the valve 13 to movement of the master piston 20. However, because of the hydraulic force multiplication resulting from the large area of piston 40, the auxiliary spring 44 is desirable to provide sufficient reaction pressure to the master cylinder (to give the proper "feel" to the operation) during power actuation. During manual actuation, the spring 44 does not affect the reaction pressure in the master cylinder because the control piston 40 is then bypassed.

It is to be noted that the ratio of the force of the reaction piston spring 42 to the force of the spring of the check valve 41b is less than the ratio of the reaction piston area to the check valve area so that the check valve 41b does not open in response to pressure in the control cylinder 39 until that pressure has risen above a value sufficient to overcome the spring 42 and close the valve face 41c on the reaction piston against the left end of the piston portion 45a, and thereby block the path to the exhaust passage 51. This prevents any loss of fluid from the master cylinder into the exhaust line during manual operation of the system. The check valve at all times maintains a pressure drop across the reaction piston 41 sufficient to maintain its face 41c seated against the piston portion 45a. This pressure drop across the check valve in the reaction piston is never sufficient to overcome the force of the spring 47 and move the poppet 45c away from its seat. However, even if there should be leakage past the poppet 45c, such leakage would be blocked by the check valve 54 from being transmitted through the passage 76 to the right end of the shuttle valve 64.

Although for the purpose of explaining the invention a particular embodiment thereof has been shown and described, obvious modifications will occur to a person skilled in the art, and we do not desire to be limited to the exact details shown and described.

We claim:

1. A valve of the type described comprising: a body defining an elongated chamber comprising a first cylinder at one end thereof, a second cylinder intermediate the ends, and a third cylinder near the other end, said cylinders being spaced from each other, an exhaust port communicating with said chamber between said first and second cylinders, a pressure port communicating with said chamber between said second and third cylinders, and a delivery port at the other end of said chamber; a reaction piston in said first cylinder having a valve face on its inner end, and means for reciprocating said reaction piston; a hollow reciprocable valve member having separated piston portions slidable in said second and third cylinders respectively, and having intermediate said piston portions a poppet movable into and out of sealing relation with said second cylinder, said hollow valve member having a transverse passage therethrough on the side of said poppet adjacent said second cylinder, and having a valve face on its end adapted to seal with said valve face on said reaction piston; and means yieldably urging said valve member in direction to seat the poppet thereon against the end of said second cylinder.

2. A valve according to claim 1 including spring means for urging said reaction piston out of engagement with said valve member.

3. A valve according to claim 1 in which said first cylinder is of larger diameter than said second and third cylinders.

4. A valve of the type described controlled by pressure fluid supplied thereto from a control source, said valve comprising: a body having a pressure port, a delivery port, an exhaust port, and a control port; a reaction piston movable in said body; valve means in said body movable with said reaction piston from an "off" position in which said delivery port is connected to said exhaust port into an "on" position in which said delivery port is disconnected from said exhaust port and connected to said pressure port, said reaction piston being exposed to and urged toward "off" position by pressure in said delivery port; a control cylinder alined with said reaction piston; a control piston in said control cylinder exposed on the side remote from said reaction piston to pressure in said control port, and mechanical linkage means between the other side of said control piston and said reaction piston for urging the latter in "on" direction in response to pressure in said control port; means defining a passage by-passing said control piston for applying fluid from said control port to said delivery port; pressure responsive valve means responsive to pressure in said pressure port for closing said by-pass passage; and check valve means for permitting flow of fluid through said by-pass passage from said control port past said reaction piston to said delivery port.

5. A valve according to claim 4 in which said pressure responsive valve means is differentially responsive to pressures in the said pressure and control ports respectively to block said by-pass passage when the pressure in the pressure port exceeds the pressure in said control port, and vice versa.

6. A valve according to claim 4 including valve means associated with said pressure responsive valve means for connecting the said other side of said control piston to exhaust when said by-pass passage is closed.

7. A valve according to claim 4 in which the reaction piston is exposed to, and urged toward "on" position by pressure in the bypass passage on the control port side of the check valve means, and means including first spring means opposing movement of said reaction piston out of "off" position, and second spring means opposing opening of said check valve, the ratio of the first spring force to the second spring force being less than the ratio of the reaction piston area to the check valve area, whereby the pressure required to open the check valve is greater than that required to move the reaction piston, and said valve means is actuated by the reaction piston to disconnect the delivery port from the exhaust port during flow of fluid from said control port through the bypass passage to the delivery port.

8. A valve according to claim 4 in which said control piston is of larger area than said reaction piston, and spring means independent of said linkage means opposing movement of said control piston by pressure in said control port.

9. A valve of the type described controlled by pressure fluid supplied thereto from a control source, said valve comprising: a body having a pressure port, a delivery port, an exhaust port, and a control port; a reaction piston movable in said body; valve means in said body movable with said reaction piston from an "off" position in which said delivery port is connected to said exhaust port into an "on" position in which said delivery port is disconnected from said exhaust port and connected to said pressure port, said reaction piston being exposed to and urged toward "off" position by pressure in said delivery port; a control cylinder aligned with said reaction piston; a control piston in said control cylinder; and mechanical linkage means between said control piston and said reaction piston for urging the latter in "on" direction in response to movement of said control piston in "on" direction; pressure responsive valve means differentially responsive to pressures in said pressure and control ports respectively for applying the pressure differential between said control port and exhaust port across said control piston to urge the latter in "on" direction when the pressure port pressure exceeds the control port pressure, and for establishing a path for fluid flow from said control port to said delivery port when the control port pressure exceeds the pressure port pressure.

References Cited in the file of this patent

UNITED STATES PATENTS

| Number | Name | Date |
|---|---|---|
| 1,912,261 | Defives | May 30, 1933 |
| 2,088,185 | Borde | July 27, 1937 |
| 2,452,647 | Gagen | Nov. 2, 1948 |
| 2,501,661 | Christensen | Mar. 28, 1950 |